Dec. 1, 1964     E. Z. FILLER     3,158,953

FISHING AID

Filed Feb. 26, 1962

INVENTOR.
EDWARD Z. FILLER

BY

*Arthur H. Seidel*

ATTORNEY

_United States Patent Office_

3,158,953
Patented Dec. 1, 1964

3,158,953
FISHING AID
Edward Z. Filler, 16 Westwood Circle,
Roslyn Heights, N.Y.
Filed Feb. 26, 1962, Ser. No. 176,185
2 Claims. (Cl. 43—43.14)

This invention relates to a fishing aid, and more particularly, to an aid which fishermen can use when casting fishing bait or lures.

The fishing aid of the present invention may be utilized with all types of bait or lures, live or artificial. The fishing aid of the present invention is particularly useful by spin-casting fishermen, or fishermen who prefer to use one rod and line to do all types of casting. The aid of the present invention will enable a spin-caster to cast a trout fly or other light lure any desired distance with greater accuracy.

The aid of the present invention may be of any desired size and weight. It may be constructed so that it will float on the surface of the water, float just below the surface, or sink slowly or rapidly. This will be accomplished by the aid of the present invention without effecting the delicate touch and feel that is necessary for success in the sport of fishing wherein a casting rod is utilized. Hence, the fishing aid of the present invention will enable a fisherman to utilize his skills to the fullest.

The fishing aid of the present invention is a hollow tapered tube which is adapted to be secured to the fishing line. Preferably, the fishing aid of the present invention is secured to the leader. The hollow tube is preferably sealed at both ends, making it air-tight and water-tight. One end of the tube is provided with a removable enclosure which facilitates the placement of a weight adjustment thereinto. The weight adjustment is preferably accomplished by placing a bead of mercury, metal shot, etc. which will freely reciprocate from one end of the tube to the other. By varying the weight of the material placed within the tube, the buoyancy of the tube can be adjusted. When casting with a trout fly, the weight of the material within the tube will be such so that the tube will not effect the ability of the fly to float on the surface of the water. When casting for bass, for example, the weight may be adjusted so that the plug or lure will sink.

It is an object of the present invention to provide a novel fishing aid.

It is another object of the present invention to provide a fishing aid adapted to be secured to a leader of a casting fly.

It is another object of the present invention to provide a fishing aid of adjustable weight thereby enabling the fishing aid to be utilized in all types of casting and enabling a fisherman to use one rod and line for all types of casting.

It is another object of the present invention to provide a fishing aid which permits a spin-caster to cast a trout fly any desired distance with greater accuracy.

It is an other object of the present invention to provide a novel universal fishing aid which is simple, efficient, and inexpensive.

Other objects will appear hereinafter.

For the purpose of illustrating the invention there is shown in the drawings forms which are presently preferred; it being understood, however, that this invention is not limited to the precise arrangements and instrumentalities shown.

Referring to the drawing in detail, wherein like numerals indicate like elements, there is shown in FIGURE 1 a fishing aid designated generally as 10.

Figure 1:
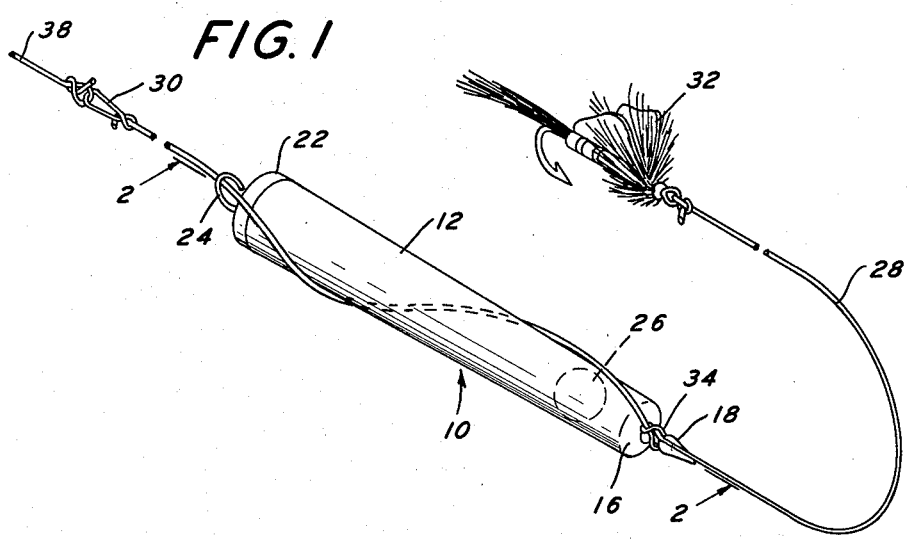
FIGURE 1 is a perspective view of a trout fly mounted on one end of a leader, with the fishing aid of the present invention removably secured to the leader.

The fishing aid 10 includes a tube 12 which is provided with an open end 14 and a closed end 16. The tube 12 is provided with an extension 18 which extends from the closed end 16 along the longitudinal axis thereof. The extension 18 is provided with a reduced diameter portion thereby forming a groove 20. The purpose of the groove 20 will be made clear hereinafter.

The tube 12 is hollow and preferably made from a lightweight waterproof material such as a plastic material. For example, the plastic material may be a styrene, an acrylic, polyethylene, etc. A stopper or the like 22 is force-fitted into the open end 14 of the tube 12. The stopper 22 is provided with a reduced diameter portion which extends into the tube 12 and a radially outwardly directed head portion which is of sufficient diameter to form a shoulder which abuts the open end 14. Such head portion will have a diameter which is substantially equal to or slightly greater than the diameter of the tube 12 at the open end 14. The stopper 22 is provided with an eyelet having a hook portion 24 extending axially from the head portion thereof. The stopper 22 is preferably made from a plastic material similar to the material from which the tube 12 is made. Plastics are preferable for making the tube 12 and stopper 22 since they are light in weight and are non-corrosive. The hook portion 24 is preferably made from a non-corrosive lightweight material such as aluminum or the like.

The weight of the tube 12 is selectively adjustable. A freely movable weight member 26 is disposed within the tube 12. The weight member 26 is capable of freely reciprocating from the stopper 22 to the closed end 16. The weight member 26 may be a bead of mercury, a lead buckshot, a glass or ceramic bead, etc. The present invention will be merchandised with a variety of weight members 26 having different weights so that the fisherman may selectively utilize the present invention in a form whereby it will float, sink to a point just below the surface level of the water, or sink to the bottom of the body of water. The force-fit between the stopper 22 and the tube 12 prevents entry of water or foreign matter thereinto. Adjustment of the weight of the tube 12 is accomplished by removing the stopper 22 and the weight member 26. Thereafter, the desired weight member is positioned within the tube 12 and the stopper 22 replaced in the disposition illustrated in FIGURE 2.

The tube 12 may be releasably secured to a fishing line. As illustrated, the tube 12 is releasably secured to a leader 28 terminating in a closed loop 30 at one end and a lure such as a trout fly 32 at the other end. The leader 28 generally has a length of approximately two feet and is generally made from catgut or nylon. The tube 12 is preferably secured to the leader 28 by forming a loop 34 in the leader 28 and tightening loop 34 around the groove 20. From the loop 34, the intermediate portion of the leader 28 is spirally wound around the tube 12 and extends through the hook portion 24.

Figure 2:
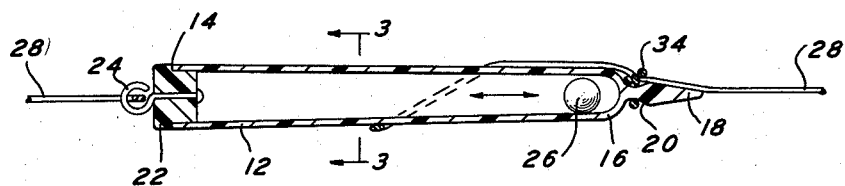
FIGURE 2 is a sectional view taken along the lines 2—2 in FIGURE 1.

As illustrated in FIGURES 1 and 2, the tube 12 is not free to dangle loosely from the leader 28, but rather extends generally therealong. As illustrated, the closed end 16 of the tube 12 is the closest end thereof to the fly 32. Since the inner surface of the tube 12 is tapered toward the closed end 16, the weight member 26 will reciprocate to the closed end 16 and remain there when the fly 32 is cast thereby hastening the wetting of the fly 32. It will be appreciated by those skilled in the art that the weight member 26 will be urged toward the end of the tube 12 which is closest to the fly 32 due to the centrifugal force exerted thereon when the line is cast. It will be appreciated that the tube 12 may be removably secured to the leader 28 with the stopper 22 being closer to the fly 32 than the closed end 16. With the elements assembled in this manner, the weight member 26 will roll back to the closed end 16 when the tube 12 has come to rest in the water.

Figures 3, 4:
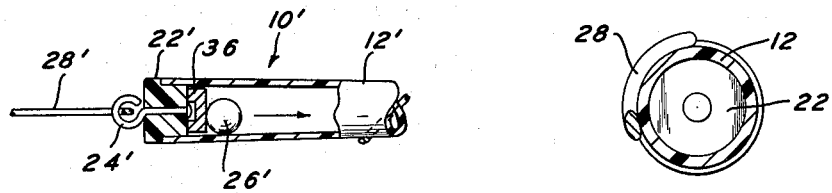
FIGURE 3 is a sectional view taken along the lines 3—3, on an enlarged scale.
FIGURE 4 is a partial longitudinal sectional view similar to FIGURE 2, but illustrating another embodiment of the present invention.

In FIGURE 4, there is disclosed another embodiment of the present invention designated generally as 10'. The fishing aid 10' is identical with the fishing aid 10 except as will be made clear hereinafter. In fishing aid 10', an additional motivating force is provided to increase the driving force applied to the weight member 26'. Hence, the inner surface of the stopper 22' is provided with a small magnet 36.

The weight member 26' is made from a magnetic material having a magnetic polarity corresponding to the polarity of the magnet 36. Hence, the magnet 36 will repel the weight member 26' and cause the same to be impelled toward the closed end of the tube 12. Such magnetic repulsion adds to the driving force which causes the weight member 26' to move toward the end of the tube 12 closest to the fly 32 when the line is cast. The leaders 28 and 28' are adapted to be secured to the free end of a fishing line 38.

Thus, it will be seen that I have provided a novel fishing aid which will enable a fisherman to utilize his skills to the fullest while at the same time enable a fisherman to use one rod and accomplish all types of casting. In connection with fly casting, the present invention does not effect the delicate touch and feel necessary for success while at the same time enables a fly to be cast any desired distance with greater accuracy.

Since the tube 12 may be secured to the fishing line or to a leader, the member to which the tube 12 will be secured may be referred to hereinafter as a flexible line. As used hereinafter, the tube 12 may be referred to as an elongated housing. Hereinafter, the weight member 26 may be referred to as a reciprocable spherical weight member supported by the housing.

The present invention may be embodied in other specific forms without departing from the spirit or essential attributes thereof, and accordingly, reference should be made to the appended claims, rather than to the foregoing specification as indicating the scope of the invention.

I claim:
1. A fishing aid for casting a fishing lure connected to a flexible line comprising a hollow elongated housing which is lighter than water and closed at one end by an imperforate wall adapted to be connected to said flexible line, a member closing the other end of said housing and movably supported by said housing so that access into the interior of said housing may be attained by removing said closing member, said closing member having a first portion abutting an end face of said other end of said housing and a second portion in sealing contact with a peripheral surface of said other end of said housing, at least one weight member reciprocally disposed within said housing, a hook portion on said closing member and movable therewith, said closing member including a magnet, said weight member being charged with the same magnetic polarity as said magnet so that said magnet repels said weight member toward said one end of said housing, and said housing being made from non-magnetic plastic resin, said hook portion on said closing member being adapted to cooperate with said flexible line for mounting said housing on said flexible line.

2. A fishing aid for casting a fishing lure connected to a flexible line comprising a hollow elongated housing closed at one end by an imperforate wall, a member closing the other end of said housing, said closing member having a portion in sealing contact with a peripheral surface of said other end of said housing, means for connecting said housing along a flexible line, a magnet connected to said closing member and at least one weight member of magnetizable material reciprocal within said housing along substantially the total length of said housing between said magnet and said imperforate wall.

References Cited in the file of this patent
UNITED STATES PATENTS

| | | |
|---|---|---|
| 12,060 | Hoard | Dec. 12, 1854 |
| 1,764,738 | Marters | June 17, 1930 |
| 1,804,084 | Blake | May 5, 1931 |
| 2,242,965 | Adams | May 20, 1941 |
| 2,458,970 | Wilson | Jan. 11, 1949 |
| 2,641,862 | Poe | June 16, 1953 |
| 2,832,169 | Clapp | Apr. 29, 1958 |
| 3,012,359 | Foster | Dec. 12, 1961 |
| 3,113,398 | Merritt | Dec. 10, 1963 |

FOREIGN PATENTS

| | | |
|---|---|---|
| 20,443 | Great Britain | Nov. 24, 1891 |